(12) United States Patent
Akatiff et al.

(10) Patent No.: US 9,640,222 B2
(45) Date of Patent: May 2, 2017

(54) MULTIVARIANT VIDEO SEGMENTATION SYSTEM AND METHOD

(71) Applicant: Coleadium, Inc., Carlsbad, CA (US)

(72) Inventors: Jason Akatiff, Carlsbad, CA (US); Ricardo Juarez, Carlsbad, CA (US); Sergey Sundukovskiy, Carlsbad, CA (US); Christopher Mathias, Carlsbad, CA (US)

(73) Assignee: VIDERIAN, INC., Carlsbad, CA (US)

( * ) Notice: Subject to any disclaimer, the term of this patent is extended or adjusted under 35 U.S.C. 154(b) by 22 days.

(21) Appl. No.: 14/599,414

(22) Filed: Jan. 16, 2015

(65) Prior Publication Data
US 2016/0211004 A1 Jul. 21, 2016

(51) Int. Cl.
| | |
|---|---|
| H04N 9/80 | (2006.01) |
| H04N 5/84 | (2006.01) |
| H04N 7/16 | (2011.01) |
| H04H 60/33 | (2008.01) |
| G11B 27/34 | (2006.01) |
| G11B 27/031 | (2006.01) |
| G11B 27/00 | (2006.01) |

(52) U.S. Cl.
CPC ............ *G11B 27/34* (2013.01); *G11B 27/002* (2013.01); *G11B 27/031* (2013.01)

(58) Field of Classification Search
USPC ................................................ 386/239–262
See application file for complete search history.

(56) References Cited

U.S. PATENT DOCUMENTS

| | | |
|---|---|---|
| 2010/0138291 A1 | 6/2010 | Silverman et al. |
| 2012/0219265 A1* | 8/2012 | Sriganesh ........... G06F 17/3082 386/230 |
| 2013/0238580 A1 | 9/2013 | D'Orazio et al. |
| 2014/0157306 A1* | 6/2014 | Deo .................... H04N 21/4788 725/34 |
| 2014/0180799 A1 | 6/2014 | Keeler et al. |

OTHER PUBLICATIONS

International Search Report and Written Opinion received in PCTUS16/13906 (20154-P002-PCT), dated Mar. 30, 2016, 10 pages.

* cited by examiner

*Primary Examiner* — Hung Dang
(74) *Attorney, Agent, or Firm* — Arc IP Law, PC; Joseph J. Mayo

(57) ABSTRACT

A multivariant video segmentation system and method including accepting video segments that make up a video, accepting video segment variants for the video segments, and selecting a particular video segment variant to provide as a video segment at a particular sequential time order. The video segments are provided to a user at each relative sequential time order via a video player on a first webpage, user inputs associated with the video player and at least one webpage are accepted, and engagements and conversions from the user inputs are determined and stored. The engagements include at least a viewing time of the user viewing the video, and conversions include completion of a predefined task by the user that differs from the user viewing the video. The video segment path with the highest engagement or conversion value associated with information related to the user viewing the video is provided to the user.

19 Claims, 8 Drawing Sheets

MULTIVARIANT VIDEO SEGMENTATION SYSTEM AND METHOD

BACKGROUND OF THE INVENTION

Field of the Invention

Embodiments of the invention generally relate to motion video signal processing and data processing such as operator interface processing and more specifically but not by way of limitation, multivariant video segmentation and split testing systems and methods that calculate and optimize user video engagements and conversions thereof and that may optionally interface with real-time bidding systems and/or real-time exchanges for example.

Description of the Related Art

Generally, monitoring and tracking the impact of videos and webpages on users purchasing products or services associated with the videos and webpages enable companies to better determine and manage the type of video content or webpage content that should be presented to potential consumers. Generally, existing products focus on either video performance or webpage performance but not both. Companies, typically, do not gain in depth knowledge of user or consumer activity associated with a video, what parts of the video are the most effective, point of sale activities and whether video advertisements are generally aiding in the company's business and financial goals. Similarly for webpages, products exist for split or A/B testing to determine whether one version or another version of a webpage produces more activity, but without regarding to any embedded video or segments within the video. For example, if a video on a webpage is not engaging enough or if the webpage itself does not keep the interest of the users that view the video or webpage, or if sales resulting from the video or webpage are low, generally the entire video or webpage may be regenerated even though only a portion or segment of the video or webpage is responsible for the low engagement or conversion rate.

For example, United States Publication 20120219265, entitled "Method and Apparatus for Use With Video Sequences", to Sriganesh et al., discloses displaying a video sequence and calculating a user attention level for a section of the video. The system of Sriganesh et al. appears to determine video player characteristics and user gaze in order to determine user attention level, identifying a group to which the user attention data is related associated with the video. Furthermore, the system of Sriganesh et al. appears to disclose playing a sequence of video only displaying the sections of the video associated with the user attention level at a minimum. However, the system of Sriganesh et al. fails to disclose tracking events external to the video or video player to determine which video, or sections thereof, corresponds to the highest engagements and/or conversions associated with the video. In addition, the system of Sriganesh et al. fails to disclose determining and adding new multiple variants to various segments of a video to optimize and increase a user's video engagement and conversions within the video player and outside of the video player, in a coordinated manner.

United States Patent Publication 2014/0180799, entitled "Techniques for Optimizing the Impact of Video Content on Electronic Commerce Sales", to Keeler et al., discloses a tool for measuring video profit for a product based on a number of visitors to a product webpage using a non-viewer conversion rate and a viewer conversion rate. The system of Keeler et al. appears to determine which video of a plurality of videos is the most effective, using an A/B test, and video characteristics such as the length of the video, the producer of the video, the script of the video, and a video abandonment factor. The system of Keeler et al., however, fails to disclose tracking events outside of the video or video player to determine which video, or sections thereof, corresponds to the highest engagements and/or conversions associated with the video. In addition, the system of Keeler et al. fails to disclose determining and adding new multiple variants to various segments of a video to optimize a user's video engagement within the video player and outside of the video player, and video conversion within the video player and outside of the video player regardless of the engagement level or rate.

United States Patent Publication 2014/0157306, entitled "Method and Apparatus for Increasing User Engagement with Video Advertisements and Content by Summarization", to Deo et al., discloses techniques for increasing user engagement by providing engagement formats that use interesting frames in a video or objects within video frames to increase user engagement in the video, frames of the video, or object within the video. The system of Deo et al. appears to disclose measuring user engagements using engagement units, and using the analysis of the user engagement measurements to optimize retargeting of advertising by showing the advertisement again to the users who previously interacted with the advertisement, making the more interesting frames of the advertisement more social and converting the advertisement content to game-like user interaction. The system of Deo et al., however, fails to disclose tracking events or engagements outside of the advertisement to determine which advertisement, or sections thereof, corresponds to the highest engagements and/or conversions associated with the advertisement. In addition, the system of Deo et al. fails to disclose determining and adding new multiple variants to various segments of a video or advertisement to optimize a user's engagement within and external to the video player or advertisement platform, and video conversion within or external to video player or advertisement platform regardless of the engagement level, engagement rate or engagement units.

Generally, as discussed above, existing analytic tools that monitor and track the impact of videos on users do not track activities that occur within the video player associated with the video and external to the video player in a coordinated manner. In addition, typically, existing systems directly correlate the user video engagement rate with the user conversion and product purchase rate. However, generally, existing systems lack any disclosure or suggestion of monitoring a user's engagements separately from a user's conversions, wherein a video's conversion rate does not necessarily directly correlate with a video's user engagement rate. Specifically, known products erroneously assume that the highest engagement rate results in the highest conversion rate.

In view of the above, there is a need for a multivariant video segmentation system and method to determine video engagements and conversions by tracking engagements and conversions within and external to the video, to determine which video, or segments thereof, corresponds to the highest engagements and/or conversions associated with the video.

BRIEF SUMMARY OF THE INVENTION

One or more embodiments of the invention provide a multivariant video segmentation system and method. At least one embodiment includes accepting a plurality of video segments that make up a video, wherein each of the video segments includes a relative sequential time order with respect to one another. One or more embodiments of the invention include accepting a plurality of video segment variants for at least one of the video segments, wherein each of the video segment variants for a particular video segment include a particular sequential time order associated with the particular video segment. In one or more embodiments, accepting the video segments and variants thereof includes a computer system that contains instructions to provide a user interface for accepting the video segment files and storing them in association with a video segment or variation thereof. Thus, embodiments of the invention provide a way for accepting variations of videos for determining engagements and conversions. Similarly, embodiments of the invention may also provide a user interface to accept events that vary the webpage itself during the playing of a video.

One or more embodiments of the invention may include accepting targeting information about a viewer of a video. This information may for example include location, demographic data, user's browsing history, or other information relevant to selecting and optimizing video variants. This information may be provided by a website or by an exchange that connects suppliers of videos with website publishers that use the videos.

At least one embodiment of the invention may include selecting a particular video segment variant from the video segment variants to provide as a video segment at the particular sequential time order when video segment variants exists for the particular video segment. One or more embodiments of the invention may include providing the video segments at each relative sequential time order to one or more users via a video player on a webpage associated with a computer. In some embodiments the selection of video segments may be based in part on targeting information obtained for the viewer of the video. At least one embodiment of the invention may include storing a video segment identifier and a video segment variant identifier associated with video segments provided as the video, for example as a video segment path that is stored in memory of the computer. One or more embodiments may include accepting user inputs associated with the video player and at least one webpage and storing user inputs in the memory of the computer. Thus, at least one segment of the video may be selected in a variety of manners and presented to users to determine what path through the video segments and variants thereof leads to the highest engagement rate and highest conversion rate, which may not be the same path.

One or more embodiments of the invention may include providing bid information for the display of video segments in addition to providing the segments themselves. This bid information may be used by exchanges or bidding systems to determine when to display the video segments and on which web pages to display them.

At least one embodiment of the invention may include determining, with respect to the video segment path, engagements from the user inputs associated with the video player or webpage(s) or both and conversions from the user inputs. Embodiments also enable storing the engagements and the conversions in the memory of the computer for later analysis and use. In one or more embodiments of the invention, the engagements include at least a viewing time of the users viewing the video, and the conversions include completion of a predefined task by the users that differs from one or more users viewing the video. For example, a script that is embedded within a "Thank You" webpage that is displayed after a product has been purchased may indicate one type of conversion. In this scenario the script may perform a function that informs a server that the webpage has been displayed, which indicates that indeed a purchase has been made. The video path and webpage may thus be stored in association with the conversion.

In at least one embodiment of the invention, selecting of the particular video segment variant may include randomly selecting the particular video segment variant. One or more embodiments of the invention may further include selecting the particular video segment variant associated with a video segment path having a highest engagement value or a highest conversion value a predetermined percentage of time and selecting other video segment variants 100 minus the predetermined percentage of time. This enables continued experimentation and swapping in of variants that may become the control or best video segment variation for a segment for example. At least one embodiment of the invention may include displaying user interface elements in the at least one webpage or changing visual characteristics of the at least one webpage or both, at predetermined points in time during the video. For example the background of a webpage may become blue at a point in the video that shows a type of water related product. In one or more embodiments, displaying the user interface elements in the webpage or changing visual characteristics of the webpage or both may include changing a background color, a background display, or displaying one or more clickable buttons or any combination thereof. One or more embodiments of the invention may include storing a first event time received of the displaying the user interface elements in the webpage or the changing of the visual characteristics of the webpage or both. At least one embodiment of the invention may include storing a second event time received of a change in the engagements and the conversions in response to displaying the user interface elements or changing the visual characteristics, or both.

One or more embodiments of the invention may include accepting a video goal, wherein the video goal includes any combination of a first goal of the engagements from the user inputs, and a second goal of the conversions from the user inputs. At least one embodiment of the invention may include determining a projected percentage of a number of the users reaching the video conversion goal. In one or more embodiments of the invention, storing of video segment identifier and any video segment variant identifier or the user inputs or both, may include storing data in a cookie associated with a web browser, and/or storing data in a database associated with a server computer.

By way of one or more embodiments, determining of the conversions from the user inputs may include accepting an event that is generated by displaying a second webpage, and accepting an event that is generated when purchasing a product or a service. In at least one embodiment, the predefined task associated with the conversions may include conversion actions received as a result of the users that occur after the users leave the video, and when a conversion metric of a product or service or a combination thereof is observed external to the video and/or the video player. In one or more embodiments, the users leaving the video may include exiting the video, pausing the video or performing an action external to the video and the video player. According to at least one embodiment, the conversion metric includes the users purchasing the product, or the service or both. This enables embodiments of the invention to determine paths to display for certain users based on information known about those users to maximize the engagements and/or conversions for that type of user.

At least one embodiment of the invention may include determining a time associated with the user inputs. In one or more embodiments, the storing of the user inputs may include storing the time associated with the user inputs. One or more embodiments of the invention may include obtaining information related to the users viewing the video, and storing the information associated with the video segment path and the engagements and the conversions in the memory. At least one embodiment of the invention may include providing the video segment path, having a highest engagement or highest conversion value associated with the information related to the users viewing the video, e.g., targeted at that type of user based on information obtained about the users viewing the video. Data on engagements and conversions may also be used in one or more embodiments to modify the bidding data provided along with video segments to an exchange or real-time bidding system.

According to one or more embodiments, the determining of the conversions from the user inputs may include determining conversions information and storing the conversions information in the memory of the computer. In at least one embodiment of the invention, the conversions information may include one or more of a type of action received leading to the conversions, and a time when the conversions occur. In one or more embodiments, the type of action received may include a selection of a displayed user interface element within the video player and a selection of a displayed user interface element external to the video player.

One or more embodiments of the invention may include logging user data of the users. In at least one embodiment, the user data may include a type of platform or second computer that is utilized when users watch the video, wherein the second computer is a computer other than the server for example. Embodiments may also log user data such as an internet protocol (IP) address associated with the second computer, and a source identifier associated with an advertisement on the at least one webpage. In one or more embodiments, the user data may include one or more of a sub identifier address associated with the at least one webpage, a time of the user inputs, and an exit type and exit time of the video player or the at least one webpage. In this manner, any type of information related to the user may be stored and utilized for selecting or providing information targeted at that type of user to maximize the engagements or conversions.

In one or more embodiments of the invention, one or more video segment variants may be provided to an advertising exchange or to a real-time bidding system for advertisements. Video segment variants may be provided along with bidding information such as target price, maximum price, target and maximum frequency, desired demographics, or any other bidding or campaign information used by an advertising exchange or a real-time bidding system. Additional data may be provided to affect the display of a web page before, during, or after a video variant is playing, or in response to user actions. Real-time bidding systems manage the sale of advertising inventory by website publishers. In these systems an advertiser may supply advertisements along with bids, and the real-time bidding system selects ads for each available impression. These systems receive information about each impression in the milliseconds before a web page is displayed; such information may include geographic and demographic data about the viewer, browsing history, or any other factors that may affect the value of the impression to various advertisers. The advertisers' bids identify the types of impressions they are interested in and the price each advertiser is willing to pay for each type of impression. Bids may be adjusted dynamically based on market conditions.

One or more embodiments of the invention interface with real-time bidding systems to manage video segment variants offered and to manage the bids for these video segment variants. One or more embodiments interface with advertisers or other suppliers of video segments to manage the bid information that those suppliers will offer to real-time bidding systems. Embodiments of the invention integrate experimentation and testing into the bids and the supplied video segment variants; for example some bids may include random selection of video variants for testing and/or engagement and/or conversion determination and may be utilized as feedback for bid valuation purposes.

In one or more embodiments of the invention, data collected on user engagements or conversions or other data on effectiveness may be used to modify bids for a real-time bidding system. In these embodiments the invention provides a feedback loop that provides bids and video segments, measures their effectiveness, and adjusts the bids and video segments based on this effectiveness.

BRIEF DESCRIPTION OF THE DRAWINGS

The above and other aspects, features and advantages of at least one embodiment of the invention will be more apparent from the following more particular description thereof, presented in conjunction with the following drawings, wherein.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
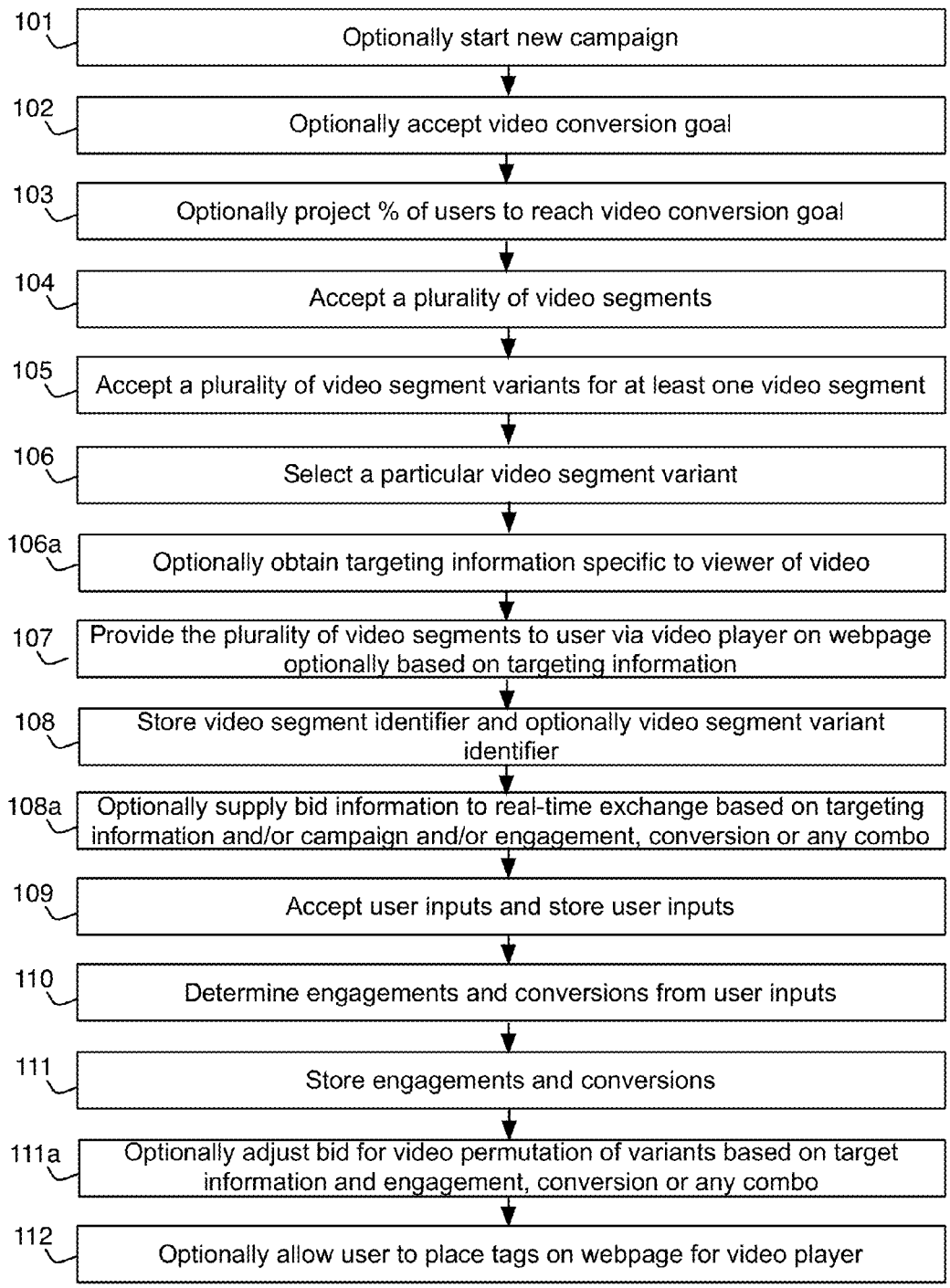
FIG. 1 is an overall exemplary flow chart using multivariant video segmentation.
Figure 2:
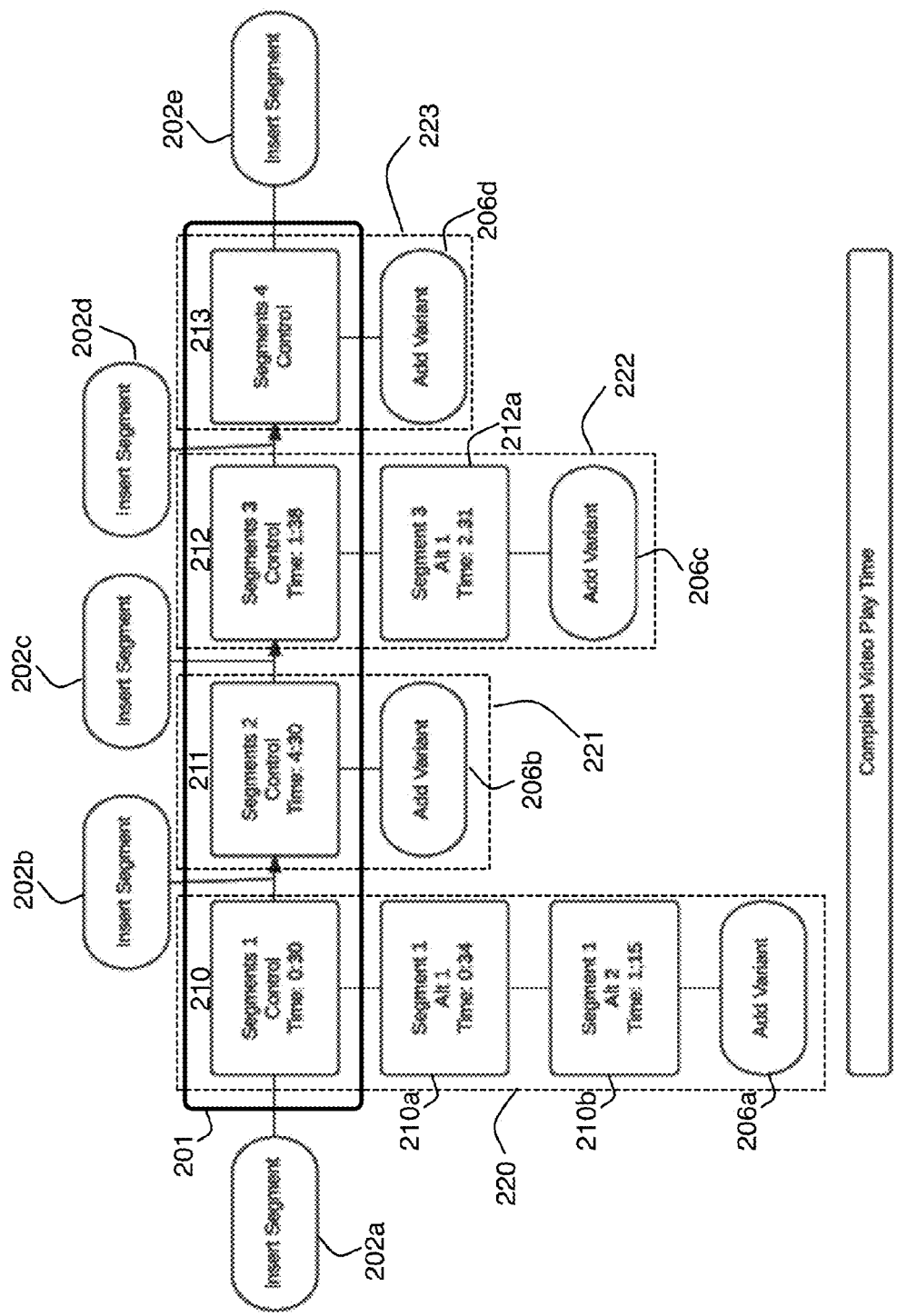
FIG. 2 is an exemplary logical view of using the multivariant video segmentation system.

One or more embodiments of the invention provide a multivariant video segmentation system and method. FIG. 1 is an overall exemplary flow chart using multivariant video segmentation, according to one or more embodiments of the invention, and FIG. 2 is an exemplary logical view of using the multivariant video segmentation system, according to one or more embodiments of the invention.

As shown in FIG. 1, at least one embodiment of the invention includes optionally starting a new campaign, at 101, optionally accepting one or more video goals, at 102, such as conversion goals, and optionally projecting a percentage of users to reach the one or more video conversion goals, at 103. In one or more embodiments of the invention, the video goal may include any combination of a first goal of the engagements from the user inputs, and a second goal of the conversions from the user inputs. At least one embodiment may include determining a projected percentage of a number of the one or more users reaching the video conversion goal.

At least one embodiment of the invention may include accepting a plurality of video segments that make up a video, at 104, wherein each of the plurality of video segments include a video segment identifier, a relative sequential time order with respect to one another, and a portion of a total playing time of the video. One or more embodiments of the invention may include accepting a plurality of video segment variants for at least one of the plurality of video segments of the video, at 105, wherein each of the plurality of video segment variants for a particular video segment include a video segment variant identifier, and a particular sequential time order associated with the particular video segment. One or more embodiments of the invention may include storing of video segment identifier and any video segment variant identifier or the user inputs or both, such as by storing data in a cookie associated with a web browser, and/or storing data in a database associated with a server computer.

As shown in FIG. 1, at least one embodiment of the invention may include selecting a particular video segment variant from the plurality of video segment variants to provide as a video segment at the particular sequential time order associated with the particular video segment when the plurality of video segment variants exists for the particular video segment, at 106. In one or more embodiments any exogenous or endogenous variable may be utilized in selecting the video segment path. Targeting information specific to the viewer may be obtained, at 106a. This information may be provided by the website or by an advertising exchange or by a real-time bidding system, for example. Such targeting information may for example include age, sex, economic, location or other variable associated with the users that are interacting with the system or any variable calculated by the system including response times, preferences calculated for a type of user, etc. One or more embodiments of the invention may include providing the plurality of video segments at each relative sequential time order to one or more users via a video player on a first webpage associated with a computer, at 107. If targeting information is available, at 106a, this information may be used to affect the selection of video segments and the order of their display. At least one embodiment of the invention may include storing the video segment identifier and any video segment variant identifier associated with the plurality of video segments provided as the video as a video segment path in a memory of the computer 108.

One or more embodiments of the invention may include providing bid information to a real-time bidding system or advertising exchange, at 108a, along with the plurality of video segments. This bid information may be used by a real-time bidding system to select website impressions on which to display the video segments. Bid information may include data such as desired characteristics of the viewers, desired frequency of display, price targets and limits, or any other information used by the bidding system. The bid information may be based on characteristics of an advertising campaign, including for example budgets, target demographics, and desired coverage of specific markets. It may be adjusted in some embodiments based on the measured engagements and conversions for various combinations of video segments. Any combination of factors may be used to set and to adjust bid information.

One or more embodiments may include accepting user inputs associated with the video player and at least one webpage and storing user inputs in the memory of the computer, at 109.

As shown in FIG. 1, at least one embodiment of the invention may include determining, with respect to the video segment path, engagements from the user inputs associated with the video player or the at least one webpage or both and conversions from the user inputs, at 110, and storing the engagements and the conversions in the memory of the computer, at 111. In one or more embodiments of the invention, the engagements may include at least a viewing time of the one or more users viewing the video, and the conversions may include completion of a predefined task by the one or more users that differs from one or more users viewing the video. Data on engagements and conversions may be used in one or more embodiments to adjust the bidding data and the video segments provided to a real-time bidding system or advertising exchange, at 111a. One or more embodiments of the invention may include optionally allowing the one or more users to place tags on a webpage for the video and video player, to direct one or more users or consumers to the video and video player, at 112.

As shown in FIG. 2, according to at least one embodiment of the invention, the multivariant video segmentation may include a user interface 210 of the video player, which accepts the plurality of video segments 210, 211, 212 and 213 that make up a video. In one or more embodiments, the video is made up of a plurality of time frames, such as time frames 220, 221, 222 and 223 that make up a compiled video play time. In at least one embodiment, time frame 220 may include a first segment such as segment 210, time frame 222 may include a second segment such as segment 211, time frame 222 may include a third segment such as segment 212, and time frame 223 may include a fourth segment such as segment 213. In one or more embodiments, each of the plurality of video segments 210, 211, 212 and 213 may include a video segment identifier, a relative sequential time order with respect to one another, and a portion of a total playing time of the video.

In one or more embodiments, the user interface 201 may include one or more segment buttons, such as 202a, 202b, 202c and 202d, and one or more variant buttons, such as 206a, 206b, 206c and 206d, to accept selection and insertion of one or more segments and variants within one or more of the plurality of segments 210, 211, 212 and 213 of the plurality of time frames 220, 221, 222 and 223, of the video. In at least one embodiment, via the user interface 201, the system may select and insert the one or more segments and variants, via the one or more segment buttons and the one or more variant buttons, in a randomized order and/or in a predefined manually selected order. In at least one embodiment of the invention, each of the plurality of video segment variants for a particular video segment, such as 210, 211, 212 and 213, include a video segment variant identifier, and a particular sequential time order associated with the particular video segment.

As shown in FIG. 2, at least one embodiment of the invention may include selecting a particular video segment variant from the plurality of video segment variants to provide as a video segment at the particular sequential time order associated with the particular video segment 210, 211, 212 and 213 when the plurality of video segment variants exists for the particular video segment. In one or more embodiments, FIG. 2 may form a user interface that executes on a server computer for example to accept video segments and variants thereof with relative increasing time shown from left to right with variants shown vertically. Any other type of interface may be utilized for accepting portions of videos. For example, using variant button 206a, one or more variants may be selected and provided for a first segment 210 within time frame 220, one or more variants may be selected and provided for a second segment 211 via variant button 206b, one or more variants may be selected and provided for a third segment 212 via variant button 206c, and one or more variants may be selected and provided for a fourth segment 213 via variant button 206d. Although shown as equal width variants, the times of each variant may differ as indicated by the time value within each variant as shown. One or more embodiments of the invention may include providing the plurality of video segments 210, 211, 212 and 213 at each relative sequential time order to one or more users via the video player on a first webpage associated with a computer.

In one or more embodiments, as discussed above, the system may, randomly or in a set order, automatically or manually using one or more control buttons, rotate through the plurality of segment variants, such as 210a, 210b and 212a, for one or more of the segments 210, 211, 212 and 213 and the respective times frames 220, 221, 222 and 223. For example, in at least one embodiment, the system may provide a plurality of segments, such as a first segment 210, second segment 211, third segment 212 and fourth segment 213, determine user engagements and conversions from the user inputs for each of the plurality of segments, and then separately rotate through and provide the plurality of segments and variants for one or more of the plurality of segments 210, 211, 212 and 213 for each time frame 220, 221, 222 and 223. For example, in one or more embodiments, the system may randomly, automatically and/or manually rotate through and provide a first segment first variant (S1V1) alternative 210a, a first segment second variant (S1V2) alternative 210b, and a third segment first variant (S3V1) alternative 212a. In one or more embodiments, the system may determine user engagements and conversions from the user inputs for each of the plurality of segments with the segment variants, such as S1V1, S1V2 and S3V1, for each of the plurality of segments and variants of the video.

In at least one embodiment of the invention, selecting of the particular video segment variant, such as 210a, 210b and 212a, may include randomly selecting the particular video segment variant. One or more embodiments of the invention may further include selecting the particular video segment variant associated with a video segment path having a highest engagement value or a highest conversion value a predetermined percentage of time and selecting other video segment variants 100 minus the predetermined percentage of time, as will be discussed further below. As shown in FIG. 2, the plurality of segments and segment variants 210, 210a, 210b, 211, 212, 212a and 213, alone and/or in combination, may indicate on the user interface 201 the respective play time duration for that segment. In one or more embodiments, the percentage of time to show the control path may be accepted numerically via a keyboard coupled with the server for example.

Figure 3:
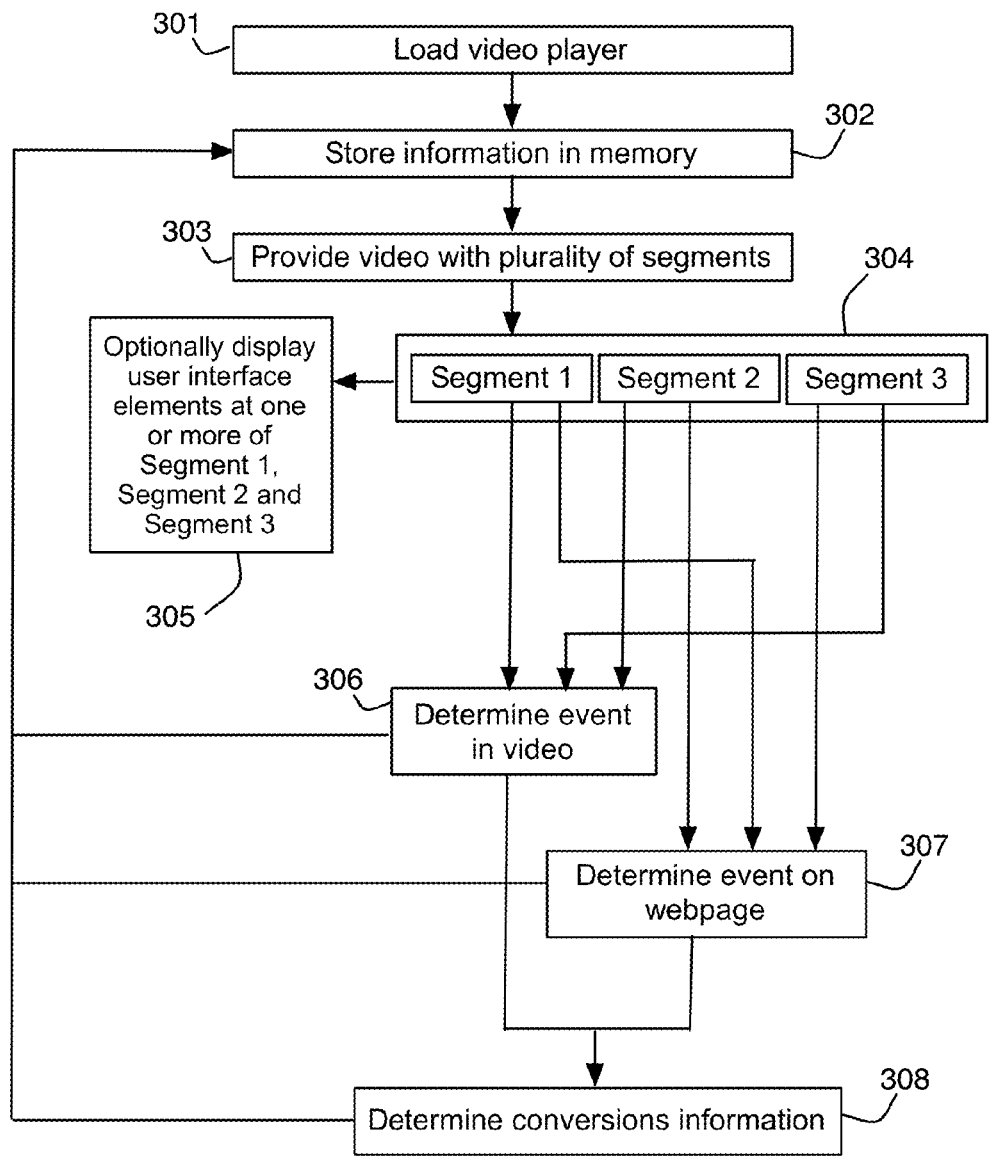
FIG. 3 is an exemplary flow chart of determining user actions, engagements, and conversions of a video using multivariant video segmentation.

FIG. 3 is an exemplary flow chart of determining user actions, engagements, and conversions of a video using the multivariant video segmentation system, according to one or more embodiments of the invention. As shown in FIG. 3, one or more embodiments of the invention may include loading the video player, at 301, and storing a plurality of information in the memory, at 302, as will be discussed further below. In one or more embodiments, any information associated with the user or users associated with the webpage may be obtained at 301 or 302. In this manner, the information such as IP address or user age or location may be utilized to determine which video segment path to select for the specific user or users watching the video. One or more embodiments of the invention include providing the video with the plurality of segments, at 303, such as segments 210, 211, 212, 213, etc., shown as Segment 1, Segment 2 and Segment 3, at 304. At least one embodiment of the invention may include optionally displaying user interface elements in the at least one webpage or changing visual characteristics of the at least one webpage or both, at predetermined points in time during the video, of one or more of the plurality of segments, at 305. In one or more embodiments, displaying the user interface elements in the at least one webpage or changing visual characteristics of the at least one webpage or both may include one or more of changing one or more of a background color, a background display, and, displaying one or more clickable buttons.

As shown in FIG. 3, one or more embodiments may include determining events in one or more of the video and the webpage for one or more of the plurality of segments of the video, and storing the events in the memory, at 302. For example, one or more embodiments of the invention may include storing, at 302, a first event time received of the displaying the user interface elements in the at least one webpage and/or the video or the changing of the visual characteristics of the at least one webpage and/or the video, or both. For example, at least one embodiment of the invention may include storing, at 302, a second event time received of a change in one or more of the engagements and the conversions in response to the displaying of the user interface elements or the changing of the visual characteristics, or both. In at least one embodiment of the invention, storing of the events may include storing the events as a cookie associated with the web browser, or in a database associated with a server computer, or both. In one or more embodiments, an event may include one or more of a selection of user interface element, such as a purchase button, for a product and/or a service on the at least one webpage the video is provided on, a second webpage confirming the purchase of a product and/or a service, such as thank you page, a selection of a user interface element, such as a purchase button, within the video, and a click through on the at least one webpage and/or the video. In at least one embodiment of the invention, the system may track and determine action data on the second webpage, such as user inputs and events, and automatically send the action data to store in memory as a cookie and/or on a database within the server.

One or more embodiments of the invention may include determining, with respect to the video segment path, engagements from the user inputs associated with the video player or the at least one webpage or both and conversions from the user inputs, at 308, and storing the engagements and the conversions in the memory of the computer, at 302. By way of one or more embodiments, determining of the conversions from the user inputs may include one or more of accepting an event that is generated by displaying the second webpage, and accepting an event that is generated when purchasing a product or a service. In at least one embodiment, the predefined task associated with the conversions may include one or more conversion actions received as a result of the one or more users that occur after the one or more users leaves the video, and when a conversion metric of a product or service or a combination thereof is observed external to the video and the video player. According to at least one embodiment, the conversion metric or the purchase of the product or service or a combination thereof includes the one or more users purchasing the product, or the service or both.

In one or more embodiments, the one or more users leaving the video may include exiting the video, pausing the video or performing an action external to the video and the video player. For example, the one or more users may one or more of hit a stop button on the video player, a pause button on the video player, or exit the first webpage or browser, resulting in a low engagement number or rate, followed by selecting a user interface element, such as the purchase button. As such, in one or more embodiments of the invention, the system may determine a conversion action as a result of the selection of the user interface element, such as the purchase button, even when the one or more users click a button that may result in a lower engagement rate. In at least one embodiment, the system avoid any incorrect analysis of the engagements rates by tracking both the actions and events within the video and the actions and events on the at least one webpage, for example simultaneously.

According to one or more embodiments, the determining of the conversions from the user inputs may include determining conversions information and storing the conversions information in the memory of computer and/or a cookie associated with the web browser, at 302. In at least one embodiment of the invention, the conversions information may include one or more of a type of action received leading to the conversions, and a time when the conversions occur. In one or more embodiments, the type of action received may include one or more of a selection of a displayed user interface element within the video player and a selection of a displayed user interface element external to the video player, as discussed above.

In at least one embodiment of the invention, storing information in a memory, at 302, and determining of the engagements and conversions information, at 308, may include determining a time associated with the user inputs. In one or more embodiments, the storing of the user inputs may include storing the time associated with the user inputs. One or more embodiments of the invention may include obtaining information related to the one or more users viewing the video, and storing the information associated with the video segment path and the engagements and the conversions in the memory. At least one embodiment of the invention may include providing the video segment path having a highest engagement or highest conversion value associated with the information related to the one or more users viewing the video to the one or more users via the video player on the first webpage, as discussed above and as will be discussed further below.

One or more embodiments of the invention may include logging user data of the one or more users. In at least one embodiment, the user data may include at least one or more of a type of platform that displays when the one or more users watch the video on a second computer, an internet protocol (IP) address associated with the second computer, and a source identifier associated with an advertisement on the at least one webpage. For example, in at least one embodiment, the source identifier associated with the advertisement may include or more webpages or applications displaying an advertisement that leads to the video once selected, such as on a social media webpage, an organization webpage, an education webpage, or any other source. In one or more embodiments, the user data may include one or more of a sub identifier address associated with the at least one webpage, a time of the user inputs, and an exit type and exit time of the video player or the at least one webpage. In at least one embodiment, an exit type and exit time may include one or more of whether the video was paused or stopped and whether the one or more users close the at least one webpage or browser, and a time associated with the exit.

Figure 4:
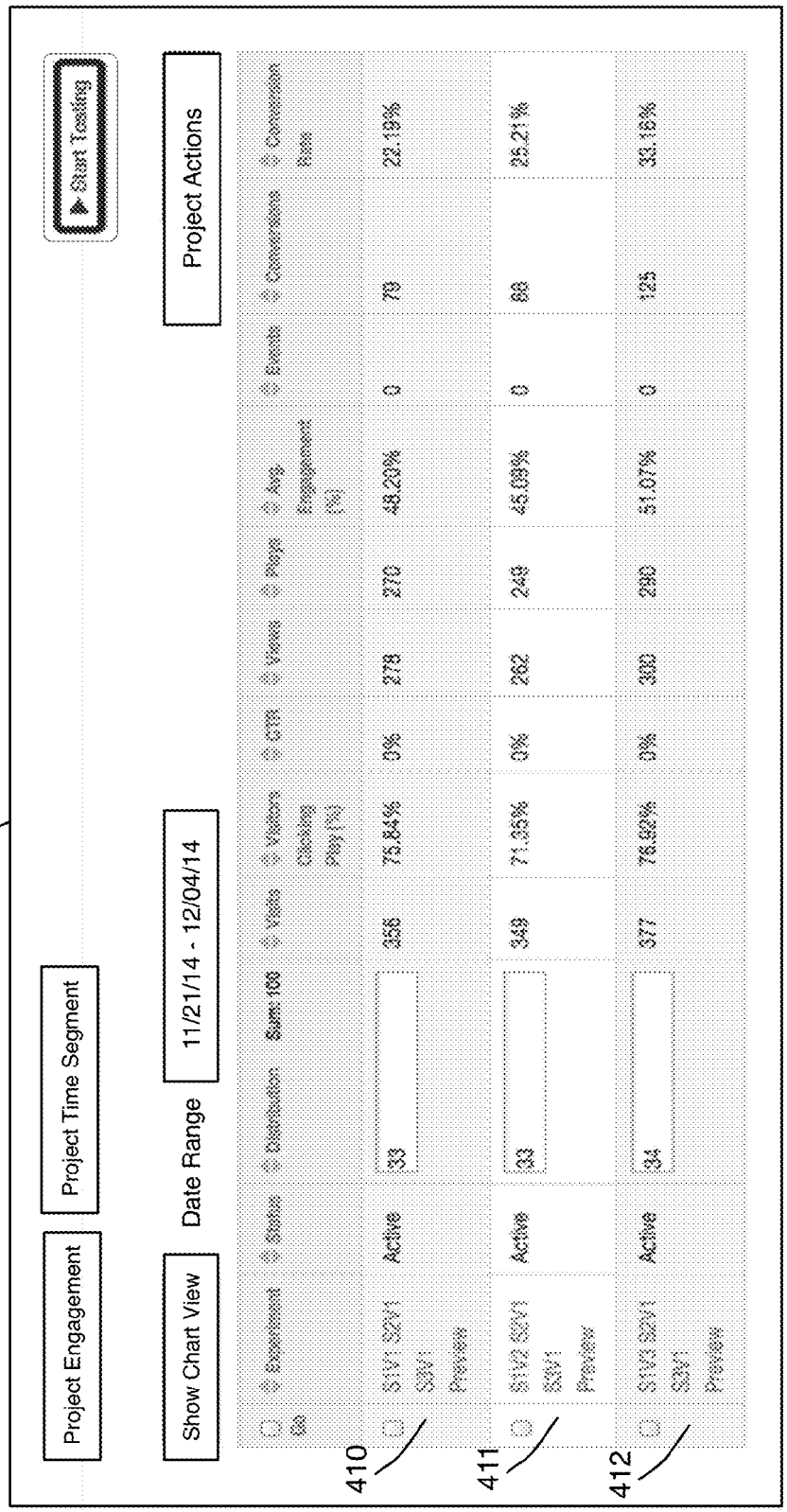
FIG. 4 is an exemplary interface of the multivariant video segmentation system showing tracking user actions, engagements, and conversions of different segments and variants of a video.

FIG. 4 is an exemplary interface of the multivariant video segmentation system showing tracking user actions, engagements, and conversions of different segments and variants of a video, according to one or more embodiments of the invention. In at least one embodiment of the invention, as shown in FIG. 4, the system may provide tracking data for each of the plurality of segments and variants thereof, for each complied playing time. For example, in one or more embodiments, the system may provide a first segment variant combination 410, a second segment variant combination 411, and a third segment variant combination 413. For example, the first segment variant combination 410 may include a first segment with a first variant thereof, a second segment with a first variant thereof, and a third segment with a first variant thereof, indicated as S1V1, S2V1 and S3V1, respectively. For example, the second segment variant combination 411 may include the first segment with a second variant thereof, the second segment with the first variant thereof, and the third segment with the first variant thereof, indicated as S1V2, S2V1 and S3V1, respectively. For example, the third segment variant combination 412 may include the first segment with a third variant thereof, the second segment with the first variant thereof, and the third segment with the first variant thereof, indicated as S1V3, S2V1 and S3V1, respectively. In at least one embodiment, any combination and number of any of the plurality of segments and variants thereof is possible, in keeping within the scope of the invention.

In one or more embodiments, for each of the segment variant combinations 410, 411 and 412, the system may determine and provide a status, a number of distributions such as number of destinations where the video is present, a number of visits from the one or more users, a number of views from the one or more users, and a number of plays from the one or more users. In at least one embodiment, for each of the segment variant combinations 410, 411 and 412, the system may determine and provide an average engagement percentage, a number of events, a number of conversions and a conversion rate.

By way of at least one embodiment, as shown in FIG. 4, the segment variant combinations, such as 410, 411 and 412, may vary in one or more of the average engagement percentage, the number of conversions and the conversion rate, such that a highest average engagement percentage may not correlate with the highest conversion rate percentage. For example, as shown in FIG. 4, according to at least one embodiment of the invention, the combination 410 with the first variant added to the first segment, has a higher average engagement percentage than combination 411 with the second variant added to the first segment, however combination 410 with the first variant in the first segment has a lower number of conversions and a conversion rate percentage than combination 411 with the second variant in the first segment. In at least one embodiment of the invention, the system may rotate through plurality of segments and the plurality of variants to provide a plurality of different segment variant combinations, and to determine which combination has the highest conversion rate percentage, without being directly correlated with a high engagement rate, as discussed above. Embodiments of the invention thus enable a novel manner in which to determine conversions from both video and webpage interaction to maximize conversions for video segment paths that may have lower engagement. This may occur if a video or webpage or both in combination result in a user purchasing a product without watching the video or staying on the webpage as long as other video segment paths. This ability to utilize video segment paths or webpage visual characteristics that result in higher conversions even for lower engagements is heretofore unknown in the art. Previous systems for example would stop at 410 and determine that would be the best video path, which would not be the case for conversion rate however.

Embodiments of the invention may continue further and add other video segment paths to improve the engagements and conversions further over time. For example, according to at least one embodiment, after rotating through the various combinations, the system may determine wherein a particular combination, such as combination 412 with the third variant added to the third segment, yields a highest engagement percentage and highest conversion rate percentage. In one or more embodiments, the system may provide the particular combination with the highest engagement percentage and/or the highest conversion rate percentage as a control segment a predetermined percentage of time, and selecting other video segment variants 100 minus the predetermined percentage of time, for each segment, variant, and combination thereof of the video. In one or more embodiments of the invention, any number of variants may be added to the control segment, such as video segment variants or empty variants when video segment variants do not exist for the particular video segment, such that the system may rotate through a plurality of variants in determining a combination of segments and variants with the highest engagements and/or conversions.

Figure 5:
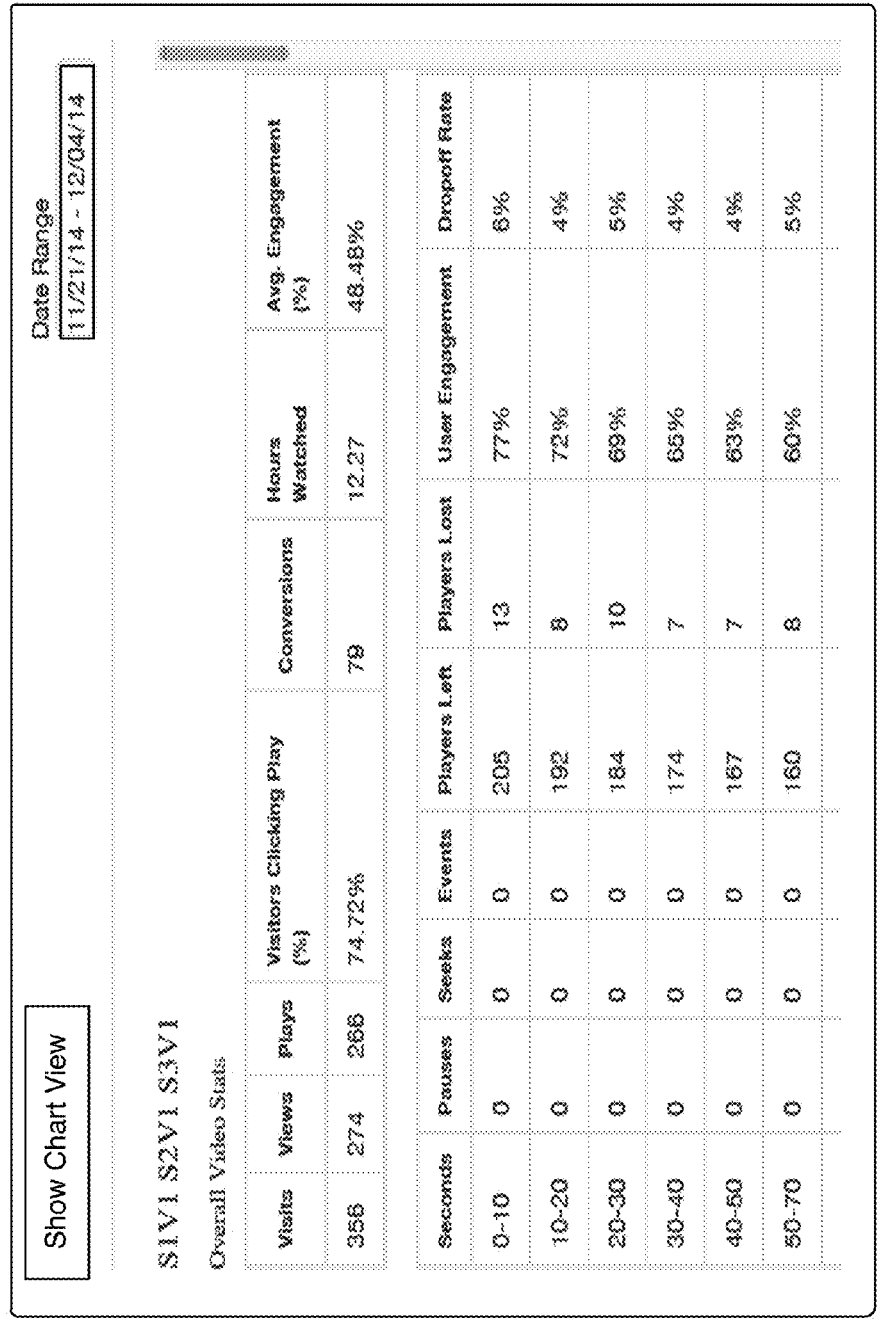
FIG. 5 is an exemplary interface of the multivariant video segmentation system showing the overall statistics of the video including user actions, engagements, conversions and drop off rates.

FIG. 5 is an exemplary interface of the multivariant video segmentation system showing the overall statistics of the video including user actions, engagements, conversions and drop off rates, according to one or more embodiments of the invention. As shown in FIG. 5, in at least one embodiment of the invention, the system may provide overall statistics for each selected segment, variant, and combination thereof, such as combinations 410, 411 and 412. For example, in one or more embodiments, a selected combination, such as S1V1/S2V1/S3V1, may be provided by determining and displaying one or more of the number of visits, the number of video plays, the percentage of visitors clicking play, the number of conversions, the numbers of hours watched, and the average engagement percentage. In at least one embodiment, the system may determine a plurality of statistics for one or more time frames within each segment of the plurality of segments of the video. For example, in one or more embodiments, as shown in FIG. 5, the system may determine a plurality of statistics for each automatically or manually selected time frames, such as at 0-10 seconds of playing time of the video, at 10-20 seconds of playing time of the video, 30-40 seconds of playing time of the video, 40-50 seconds of playing time of the video, etc. In one or more embodiments, the statistics may include one or more of the number of pauses, seeks, events, players/users left or remaining, players/users lost or exited, the percentage of user engagement and the drop-off rate percentage. In at least one embodiment of the invention, the system may determine the overall statistics for one or more of at least one specific segment variant combinations, for a specific time frame of the video, and for a specific date range the video was provided to the one or more users and/or provided to the at least one webpage and the source. This type of engagement per time enables the determination of which video segment variants result in higher engagement, meaning a successful video segment variant, or lower engagement that may signal the need for a new video segment variant at that time.

Figure 6:
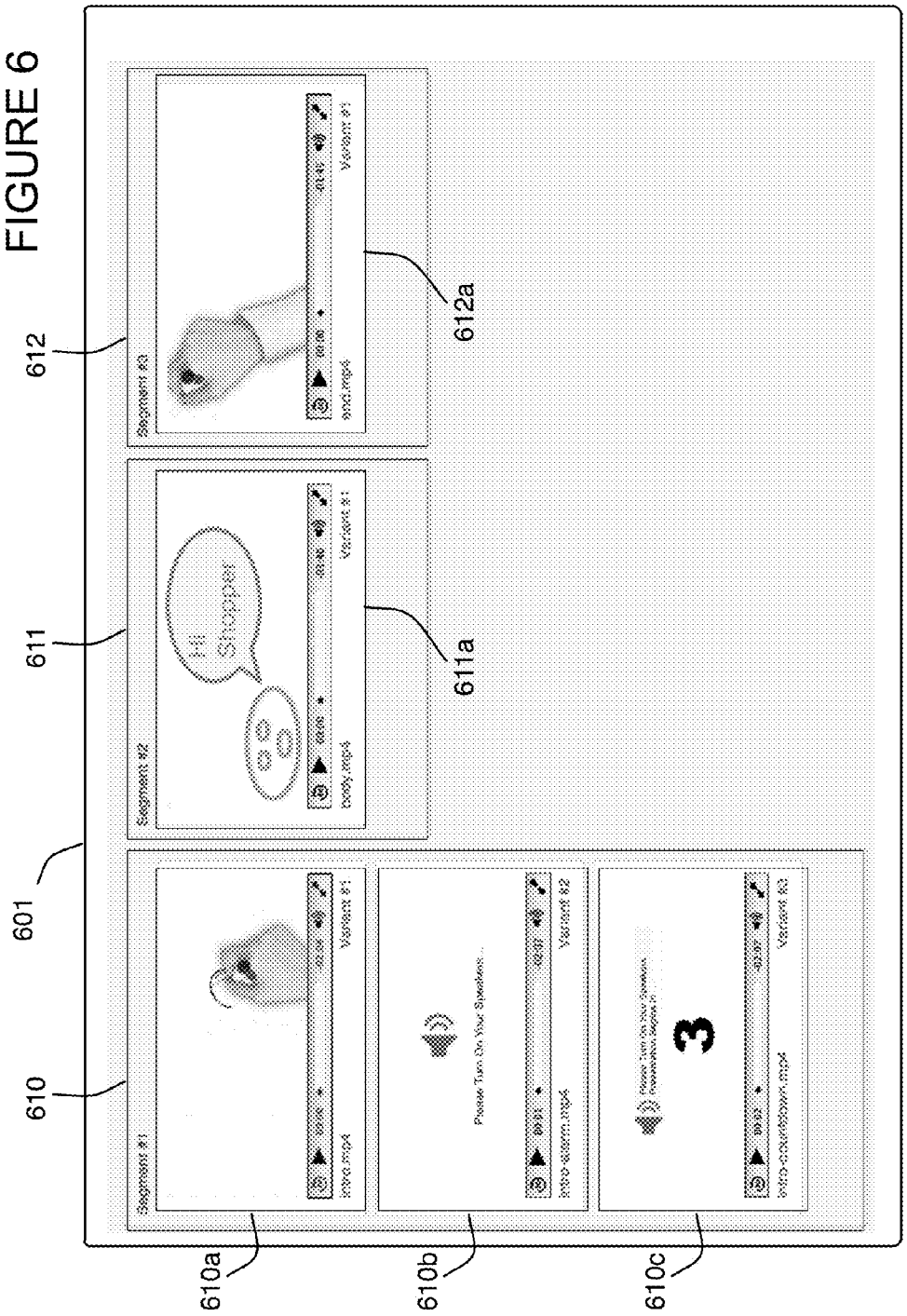
FIG. 6 is an exemplary interface of the multivariant video segmentation system showing the user interface for accepting different segments and variants of a video, according to one or more embodiments of the invention.

FIG. 6 is an exemplary interface of the multivariant video segmentation system showing a user interface for displaying different segments and variants of a video, according to one or more embodiments of the invention. As shown in FIG. 6, in at least one embodiment of the invention, the user interface 601, corresponding to the user interface 201, may determine, provide and display the plurality of segments 610, 611 and 612, corresponding to segments 210, 211 and 212, and the variants and combinations thereof. For example, in one or more embodiments, the user interface may display the video player with the first segment and the first variant thereof 610a, the first segment and the second variant thereof 610b and the first segment and the third variant thereof 610c. In at least one embodiment, for example, the combinations 610a, 610b, 610c may include different variants for the first segment, such as different introduction video variants for the first video segment 610. In one or more embodiments, for example, the combination 611a for the second video segment 611 may include the second segment with a first variant, and combination 612a for the third video segment 612 may include the third segment with a first variant. According to one or more embodiments of the invention, the system may determine and provide any number of segments, variants and combinations thereof, in keeping within the scope of the invention.

Figure 7:
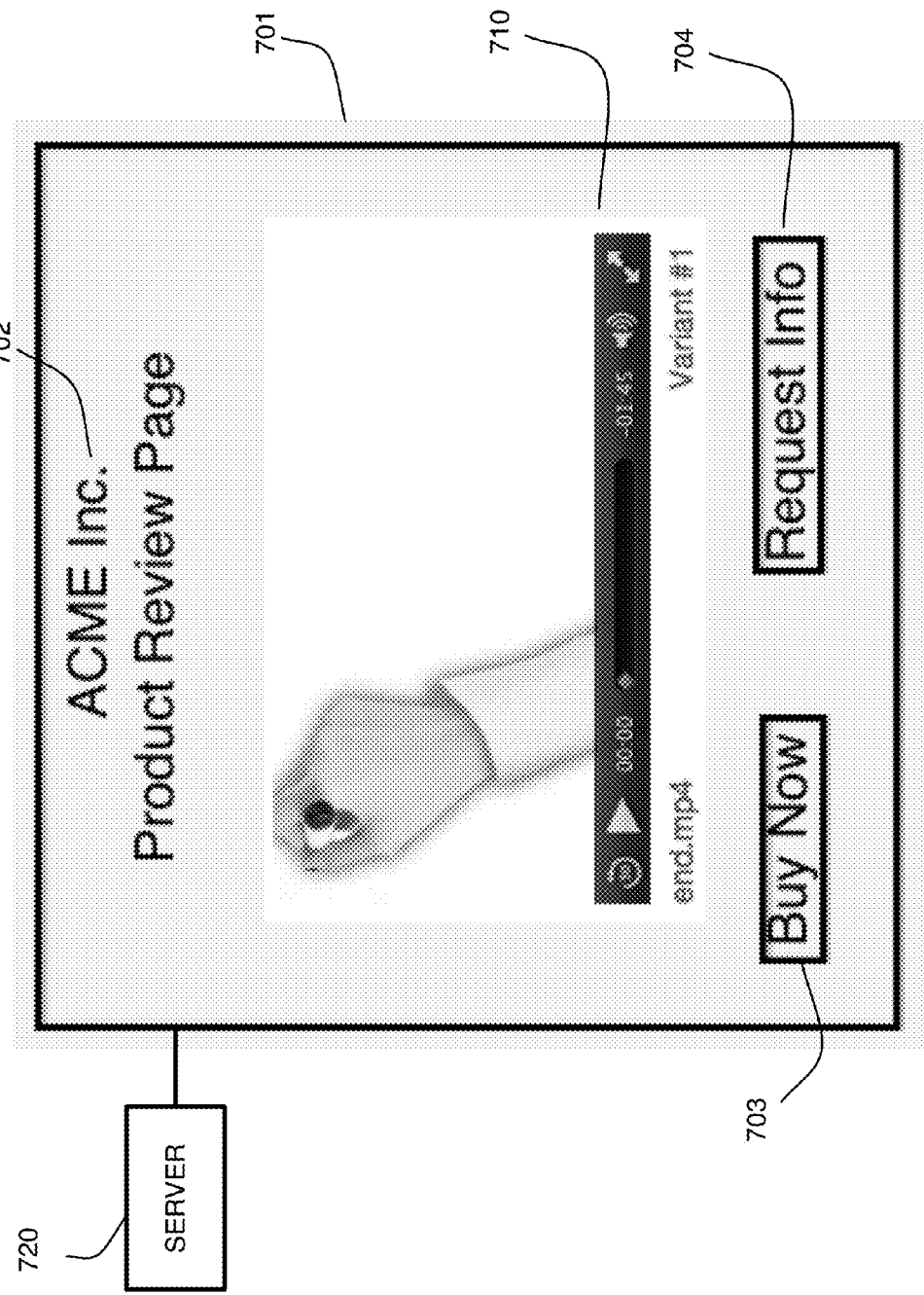
FIG. 7 is an exemplary interface of a webpage and video player utilized by a user to interact with embodiments of the invention.

FIG. 7 is an exemplary interface of a webpage and video player utilized by a user to interact with embodiments of the invention. As shown, server 720 provides a URL to any script and a video player 710 that is embedded in webpage 701 along with any text or background 702 that may change over time as instructed by the system. Any buttons or other user interface elements may be shown or their visual characteristics changed over time during the video, including Buy button 703 and Info button 704. For example, the visibility of the buttons may change over time from invisible to visible, or their colors or positions may change. Any other visual characteristic of any element outside the video player may be altered during the video for example via JavaScript or any other webpage scripting language. If the Buy button is clicked, in one or more embodiments if this event is associated with a conversion, then the conversion time and any other information may be stored in a cookie in the browser displaying the webpage and sent to server 720 as described with respect to FIG. 3. In one or more embodiments, the Buy button 703 may display a shopping cart page and on successful completion of credit card acceptance, may display a Thank You webpage that embeds script that informs the server 720 that the conversion has actually occurred.

Figure 8:
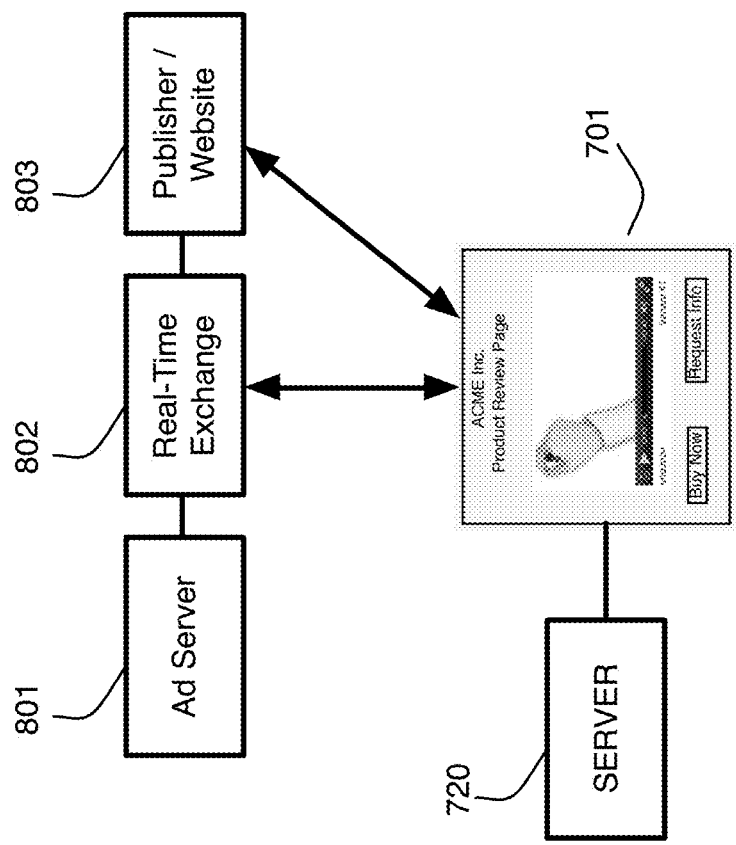
FIG. 8 is an exemplary system architecture diagram for one or more embodiments of the system.

FIG. 8 is an exemplary system architecture diagram for one or more embodiments of the system. As shown an advertisement server 801 may be utilized to provide advertisement banners or videos to a real-time exchange 802, which may implement in a real-time bidding process to match impressions available at a publisher or website 803 with advertisements at server 801 for example. Embodiments of the system may interface with the publisher or website 803 as described above or with real-time exchange 802 in a real-time bidding scenario. Embodiments of the invention may also integrate with or act as a demand-side platform, which may be depicted as real-time exchange 802 for ease of viewing, or which may be implemented as a separate system for example. Embodiments of the system may thus be utilized to optimize advertising videos in addition to marketing videos such as pre and post-roll videos. Any type of communication scheme or protocol may be utilized in advertising embodiments of the invention including but not limited to video advertising specification compliance with IAB VPAID, MRAID, and SafeFrame or any other communication protocol.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A multivariant video segmentation method comprising:
   accepting a plurality of video segments that make up a video, wherein each of the plurality of video segments comprise
      a video segment identifier,
      a relative sequential time order with respect to one another, and
      a portion of a total playing time of the video;
   accepting a plurality of video segment variants for at least one of the plurality of video segments of the video, wherein each of the plurality of video segment variants for a particular video segment comprise
      a video segment variant identifier, and
      a particular sequential time order associated with the particular video segment;
   selecting a particular video segment variant from the plurality of video segment variants to provide as a video segment at the particular sequential time order associated with the particular video segment when the plurality of video segment variants exists for the particular video segment;
   providing the plurality of video segments at each relative sequential time order to one or more users via a video player on a first webpage associated with a computer;
   storing the video segment identifier and any video segment variant identifier associated with the plurality of video segments provided as the video as a video segment path in a memory of the computer;
   accepting user inputs associated with
      the video player
      and
      at least one webpage;
   storing user inputs in the memory of the computer;
   determining with respect to the video segment path,
      engagements from the user inputs associated with the video player or the at least one webpage or both, wherein the engagements comprise at least a viewing time of the one or more users viewing the video, and
      conversions from the user inputs wherein the conversions comprise completion of a predefined task by the one or more users that differs from one or more users viewing the video,
         wherein the predefined task associated with the conversions further comprises one or more conversion actions received as a result of the one or more users and that occur
            after the one or more users leaves the video by exiting the video, pausing the video or performing an action external to the video and the video player, and,
            when a purchase of a product or service or a combination thereof is observed external to the video and the video player;
   rotating through the plurality of segments and the plurality of variants and providing a plurality of different segment variant combinations, and determining which of the different segment variant combinations has a highest conversion rate percentage, without being directly correlated with a high engagement rate; and,
   storing the engagements and the conversions in the memory of the computer.

2. The method of claim 1, wherein the selecting of the particular video segment variant comprises randomly selecting the particular video segment variant.

3. The method of claim 1, further comprising selecting the particular video segment variant associated with a video segment path having a highest engagement value or the highest conversion rate percentage and selecting other video segment variants 100 minus the predetermined percentage of time.

4. The method of claim 1, further comprising displaying user interface elements in the at least one webpage or changing visual characteristics of the at least one webpage or both, at predetermined points in time during the video.

5. The method of claim 4, wherein said displaying user interface elements in the at least one webpage or said changing visual characteristics of the at least one webpage or both comprises one or more of
   changing one or more of a background color and a background display, and,
   displaying one or more clickable buttons.

6. The method of claim 5, further comprising
   storing a first event time received of said displaying said user interface elements in the at least one webpage or said changing said visual characteristics of the at least one webpage or both, and
   storing a second event time received of a change in one or more of the determined engagements and the conversions in response to said displaying said user interface elements or said changing said visual characteristics or both.

7. The method of claim 1, wherein the storing of video segment identifier and any video segment variant identifier or the user inputs or both, comprises storing data in a cookie associated with a web browser, or storing data in a database associated with a server computer, or both.

8. The method of claim 1, wherein the determining of the conversions from the user inputs comprises accepting an event that is generated by displaying a second webpage or when purchasing a product or a service.

9. The method of claim 1, further comprising determining a time associated with the user inputs, and wherein the storing of the user inputs further comprises storing the time associated with the user inputs.

10. The method of claim 1, further comprising
obtaining information related to the one or more users viewing the video, and
storing said information associated with the video segment path and the engagements and the conversions in said memory.

11. The method of claim 10, further comprising providing the plurality of video segments according to the video segment path having a highest engagement or the highest conversion rate percentage associated with the information related to the one or more users viewing the video to the one or more users via the video player on the first webpage.

12. The method of claim 1, wherein the determining of the conversions from the user inputs comprises determining conversions information comprising
a type of action received leading to the conversions, wherein the type of action received comprises one or more of a selection of a displayed user interface element within the video player and a selection of a displayed user interface element external to the video player, and
a time when the conversions occur.

13. The method of claim 1, further comprising logging user data of the one or more users, wherein said user data comprises
a type of platform that displays the video when the one or more users watch the video on a second computer,
an internet protocol (IP) address associated with the second computer,
a source identifier associated with the at least one webpage that displays the video,
a sub identifier address associated with an advertisement on the at least one webpage,
a time of the user inputs, and,
an exit type and exit time of the video player or the at least one webpage.

14. The method of claim 1, wherein the user input comprises an event that comprises one or more of a video player load event, a video player stop event, a video player play event, a webpage button click event, a webpage load event, a webpage close event, and a webpage back event.

15. The method of claim 1, further comprising
obtaining targeting information associated with the one or more users and
wherein the providing the plurality of video segments comprises providing the plurality of video segments based on the targeting information.

16. The method of claim 15, further comprising supplying bid information to a real-time exchange based on at least the targeting information.

17. The method of claim 15, further comprising adjusting bid information at a real-time exchange based on at least the
engagements or
conversions or
engagements and conversions.

18. A multivariant video segmentation method comprising:
accepting a plurality of video segments that make up a video, wherein each of the plurality of video segments comprise
a video segment identifier,
a relative sequential time order with respect to one another, and
a portion of a total playing time of the video;
accepting a plurality of video segment variants for at least one of the plurality of video segments of the video, wherein each of the plurality of video segment variants for a particular video segment comprise
a video segment variant identifier, and
a particular sequential time order associated with the particular video segment;
selecting a particular video segment variant from the plurality of video segment variants to provide as a video segment at the particular sequential time order associated with the particular video segment when the plurality of video segment variants exists for the particular video segment,
wherein the selecting of the particular video segment variant comprises randomly selecting the particular video segment variant;
providing the plurality of video segments at each relative sequential time order to one or more users via a video player on a first webpage associated with a computer;
storing the video segment identifier and any video segment variant identifier associated with the plurality of video segments provided as the video as a video segment path in a memory of the computer;
accepting user inputs associated with
the video player
and
at least one webpage;
storing user inputs in the memory of the computer;
determining with respect to the video segment path,
engagements from the user inputs associated with the video player or the at least one webpage or both, wherein the engagements comprise at least a viewing time of the one or more users viewing the video, and
conversions from the user inputs wherein the conversions comprise completion of a predefined task by the one or more users that differs from one or more users viewing the video,
wherein the determining of the conversions from the user inputs comprises accepting an event that is generated by displaying a second webpage or when purchasing a product or a service;
storing the engagements and the conversions in the memory of the computer;
rotating through the plurality of segments and the plurality of variants and providing a plurality of different segment variant combinations, and determining which of the different segment variant combinations has a highest conversion rate percentage, without being directly correlated with a high engagement rate; and,
selecting the particular video segment variant associated with a video segment path having a highest engagement value or the highest conversion rate percentage and selecting other video segment variants 100 minus the predetermined percentage of time.

19. A multivariant video segmentation method comprising:
accepting a plurality of video segments that make up a video, wherein each of the plurality of video segments comprise
a video segment identifier,
a relative sequential time order with respect to one another, and
a portion of a total playing time of the video;

accepting a plurality of video segment variants for at least one of the plurality of video segments of the video, wherein each of the plurality of video segment variants for a particular video segment comprise
- a video segment variant identifier, and
- a particular sequential time order associated with the particular video segment;

selecting a particular video segment variant from the plurality of video segment variants to provide as a video segment at the particular sequential time order associated with the particular video segment when the plurality of video segment variants exists for the particular video segment;

providing the plurality of video segments at each relative sequential time order to one or more users via a video player on a first webpage associated with a computer;

storing the video segment identifier and any video segment variant identifier associated with the plurality of video segments provided as the video as a video segment path in a memory of the computer;

accepting user inputs associated with
- the video player
- and
- at least one webpage;

storing user inputs in the memory of the computer;

determining with respect to the video segment path,
- engagements from the user inputs associated with the video player or the at least one webpage or both, wherein the engagements comprise at least a viewing time of the one or more users viewing the video, and
- conversions from the user inputs wherein the conversions comprise completion of a predefined task by the one or more users that differs from one or more users viewing the video,
- wherein the determining of the conversions from the user inputs comprises accepting an event that is generated by displaying a second webpage or when purchasing a product or a service;

storing the engagements and the conversions in the memory of the computer;

rotating through the plurality of segments and the plurality of variants and providing a plurality of different segment variant combinations, and determining which of the different segment variant combinations has a highest conversion rate percentage, without being directly correlated with a high engagement rate;

selecting the particular video segment variant associated with a video segment path having a highest engagement value or the highest conversion rate percentage and selecting other video segment variants 100 minus the predetermined percentage of time;

obtaining information related to the one or more users viewing the video;

storing said information associated with the video segment path and the engagements and the conversions in said memory; and, providing the plurality of video segments according to the video segment path having a highest engagement or the highest conversion rate percentage associated with the information related to the one or more users viewing the video to the one or more users via the video player on the first webpage.

* * * * *